United States Patent
Scott et al.

[11] 3,904,178
[45] Sept. 9, 1975

[54] HOUSEHOLD FOOD MIXER

[75] Inventors: William H. Scott, Lombard; Eugene B. Szymczak, Glen Ellyn, both of Ill.

[73] Assignee: Sunbeam Corporation, Chicago, Ill.

[22] Filed: Dec. 23, 1974

[21] Appl. No.: 535,207

[52] U.S. Cl. ............ 259/1 R; 240/2 MT; 259/84
[51] Int. Cl.² .......................................... B01F 9/12
[58] Field of Search ............ 259/1 A, 1 R, DIG. 35, 259/DIG. 25, DIG. 26, DIG. 27, 84, 85, 104; 240/2 E, 2 BB, 2 MT, 2 SF, 2 VC

[56] References Cited
UNITED STATES PATENTS

| | | | |
|---|---|---|---|
| 2,275,878 | 3/1942 | Allenby | 259/84 |
| 2,440,041 | 4/1948 | Clark | 240/2 SF |
| 2,525,588 | 10/1950 | Cameron | 240/2 E |
| 2,654,847 | 10/1953 | Ernst | 240/2 MT |
| 2,877,001 | 3/1959 | Kaufman | 259/84 |
| 2,965,748 | 12/1960 | Bonanno | 240/2 BB |

*Primary Examiner*—Robert W. Jenkins
*Attorney, Agent, or Firm*—George R. Clark; Neil M. Rose; John S. Pacocha

[57] ABSTRACT

A household food mixer including means for illuminating the area adjacent to the mixer and the ingredients being mixed. The illuminating means consists of an electric light, socket and bulb which are carried by a simple frame easily attached to the exterior of the mixer housing.

10 Claims, 8 Drawing Figures

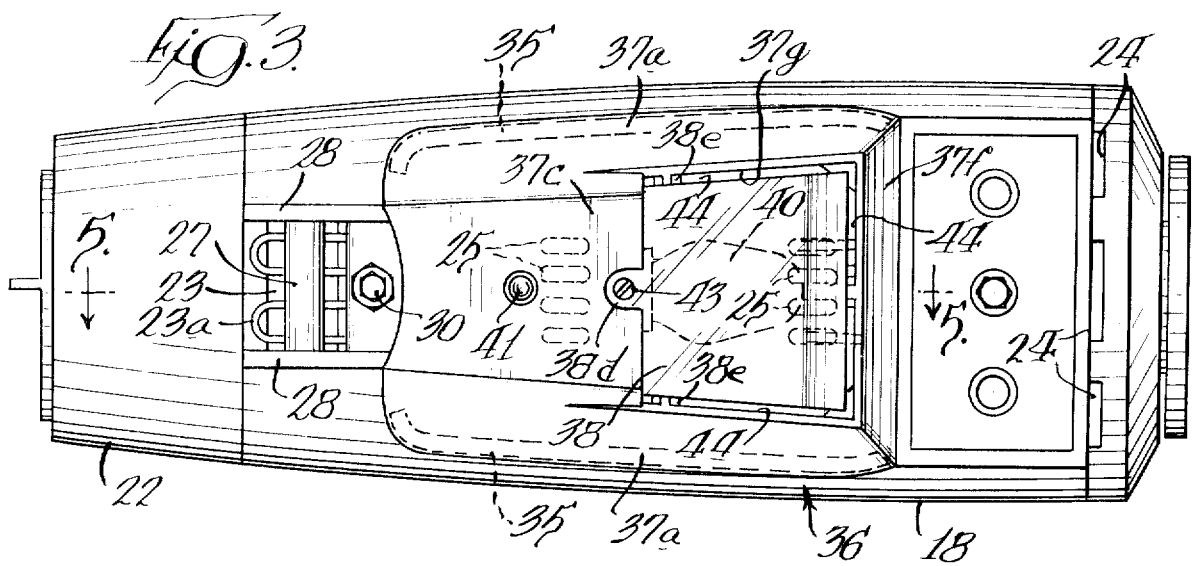
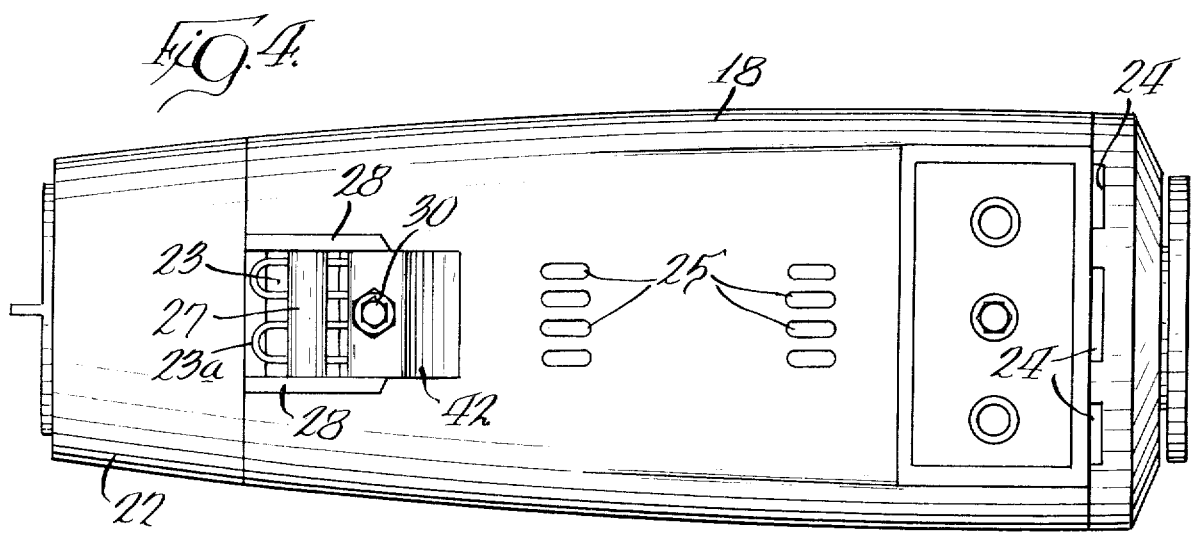
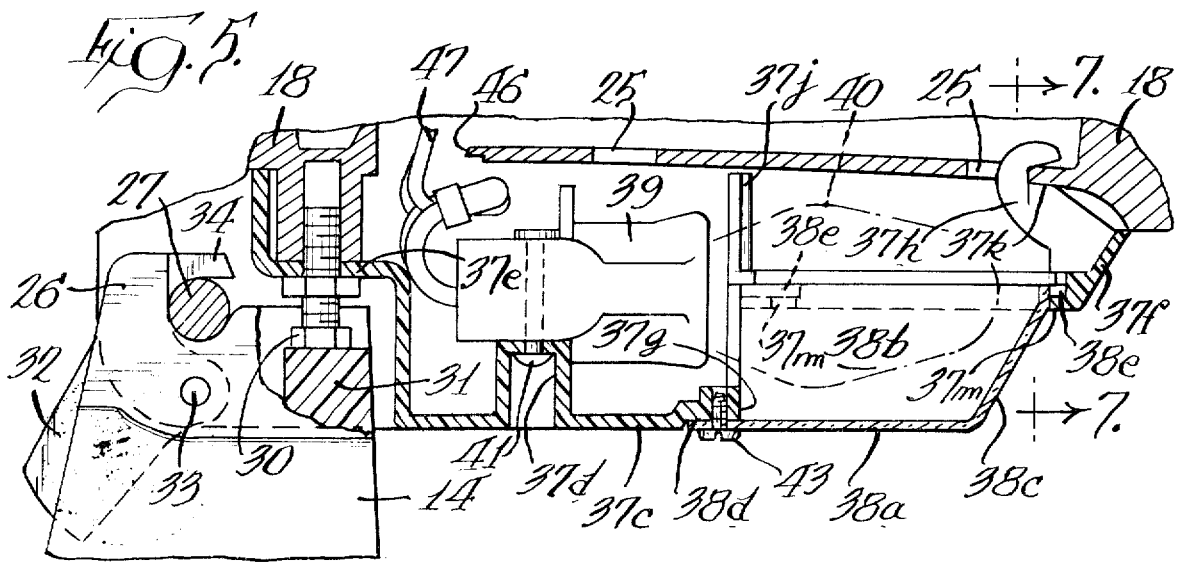

HOUSEHOLD FOOD MIXER

BACKGROUND OF THE INVENTION

The invention relates generally to electric household food mixers and more specifically to a light associated with such a food mixer.

Although it has been well known in the art to provide local illuminating means or lights in connection with household food mixers, there have been no commercially successful mixers marketed with this feature during the past several decades. One example of a prior art patent disclosing such illuminating means on 2,275,878 household food mixer is the U.S. Pat. No. 2,375,878 to Allenby. The Allenby patent discloses an electric light which is mounted in a recess in the housing of the mixer with the bulb positioned to direct the light downwardly to illuminate the contents of the mixing bowl. The light is electrically connected so as to be energized only when the motor of the mixer is operated. The light in the Allenby patent is clearly intended to illuminate a fairly local area around the mixer beaters.

Under current market conditions, there is a considerable amount of price competition in the sales of electric household food mixers. Although it is desirable to have a light associated with a food mixer, this feature adds substantially to the cost of the mixer. Accordingly, there are many consumers who would prefer to purchase mixers without the feature in order to purchase the mixer at a lower price. As a consequence of this situation, it is necessary from a commercial standpoint for a manufacturer to market mixers which have the light feature and those which do not. One problem presented by marketing mixers both with the light and without the light is, of course, the increased tooling involved in making the mixer housing suitable for use with a light as well as a version in which the light could be omitted.

In considering the functions to be performed by a light used in conjunction with a mixer, it is necessary to examine the conditions found in a normal kitchen. In many kitchens, the principal source of illumination is located on the ceiling of the kitchen toward the center of the room. Such an arrangement is generally satisfactory as far as providing good overall illumination of the room. When the operator is standing in front of a counter top, however, preparing a recipe or perhaps using a food mixer, there is a tendency for the operator to cast a shadow over the workplace since the source of illumination is usually directly behind him. This condition makes it difficult to read recipes, measure small quantities of food accurately as well as observe the conditions in the mixing bowl as the preparation of the recipe proceeds. For these reasons, it would be desirable to have any light associated with a mixer provide overall illumination and not simply light the contents of the mixing bowl. For these same reasons, it would be desirable to have a light which would be illuminated continuously and not only when the mixer is being operated.

SUMMARY OF THE INVENTION

The invention involves a food mixer having a light mounted on the housing of the mixer and connected electrically to the circuit of the mixer. The means for mounting the light include a frame which is associated with the housing of a conventional mixer so as to minimize tooling costs in producing both the lighted mixer as well as a nonlighted version. The frame is adapted to engage in the cooling slots for the motor housing at one end and be secured at the other end by a screw which serves as an adjustment means for the motor housing and as such comprises part of the stand mounting means. A detachable lense overlies the bulb which projects into an opening in the frame so that the light illuminates not only the contents of the mixing bowl but also the surrounding area. Air circulation spaces are provided between the lense and the frame to permit the motor cooling air to circulate through the light enclosure.

Means associated with the frame are positioned to engage the sidewall of the mixer housing and prevent the portion of the frame which mounts the bulb from being deflected into engagement with the sidewall of the mixer housing wherein it might be broken. The light is connected in circuit with the mixer so that the light will be continuously illuminated when the mixer is plugged in and will act as a signal notifying the operator that the mixer is connected to a source of electric power.

It is an object of the present invention to provide an improved electric household mixer having lighting means associated with the mixer housing.

It is a further object of the present invention to provide an improved food mixer having mounting means for a light bulb associated with the exterior of a conventional mixer housing.

Still another object of the present invention is to provide illumination means for a household food mixer wherein the means for mounting the illuminating means is assembled to the bottom portion of the mixer housing by means which engage air circulation openings in the housing.

Still another object of the present invention is to provide an improved food mixer having illuminating means including a frame and lense which are readily attachable to the exterior surface of a mixer housing.

Other objects and advantages of the present invention will be apparent to those skilled in the art from the following specification including the drawings and the claims.

BRIEF DESCRIPTION OF THE DRAWINGS

FIG. 3 is a bottom plan view of the mixer of FIGS. 1 and 2 shown removed from the stand and with the bowl and beaters removed;

FIG. 4 is another bottom plan view of the mixer housing similar to FIG. 3 but shown with the illuminating means removed;

FIG. 5 is an enlarged fragmentary sectional view taken on line 5—5 of FIG. 3;

DESCRIPTION OF THE PREFERRED EMBODIMENT

Figure 1:
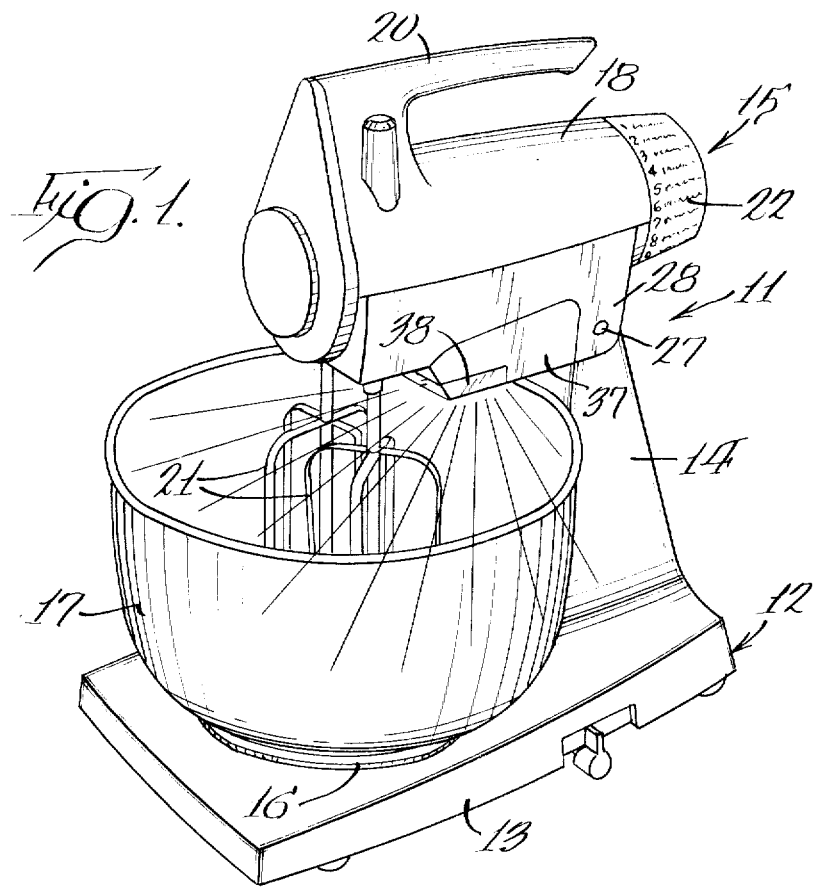
FIG. 1 is a perspective view of a food mixer embodying the invention.

Referring now to the drawings, there is shown in FIG. 1 a household electric food mixer referred to generally by reference numeral 11. The mixer 11 includes a stand 12 having a base portion 13 and a column portion 14 at the top of which a power unit 15 is supported. Since the power unit 15 may be used separately as a portable mixer as well as being associated with the stand for use as a stand mixer, the power unit 15 will also be referred to alternatively as a mixer. The base portion 13 of the stand 12 includes a rotary turntable 16 on which a bowl 17 is positioned. The turntable 16 permits the bowl 17 to be rotated so as to achieve optimum mixing of the contents.

Figure 2:
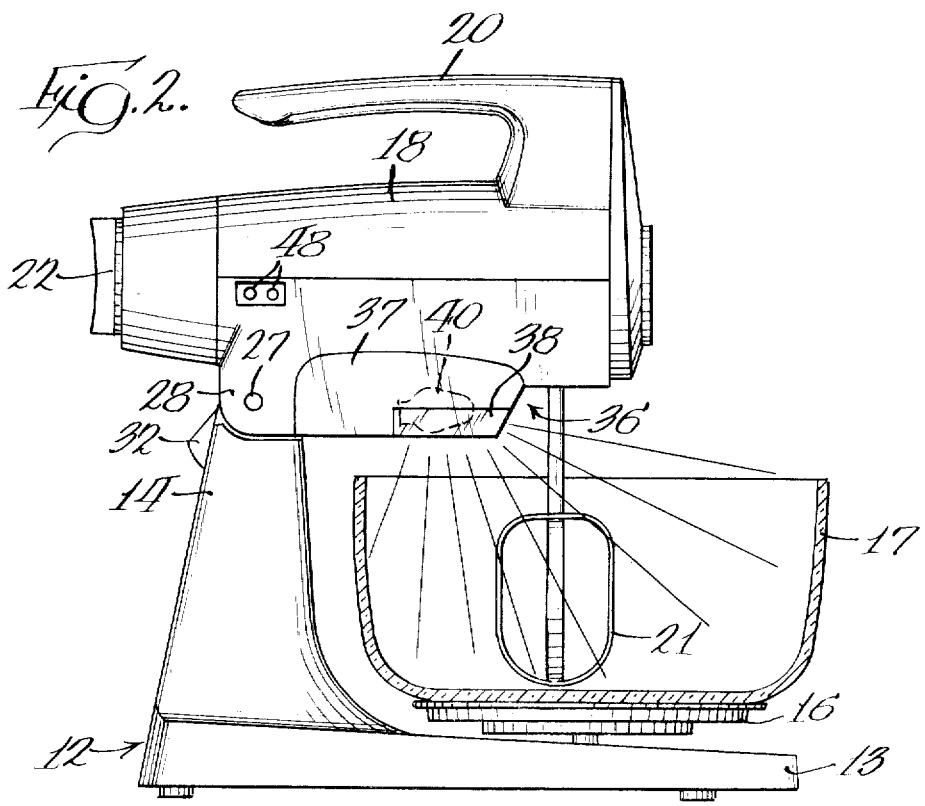
FIG. 2 is a side elevational view of the food mixer of FIG. 1.
Figure 6:
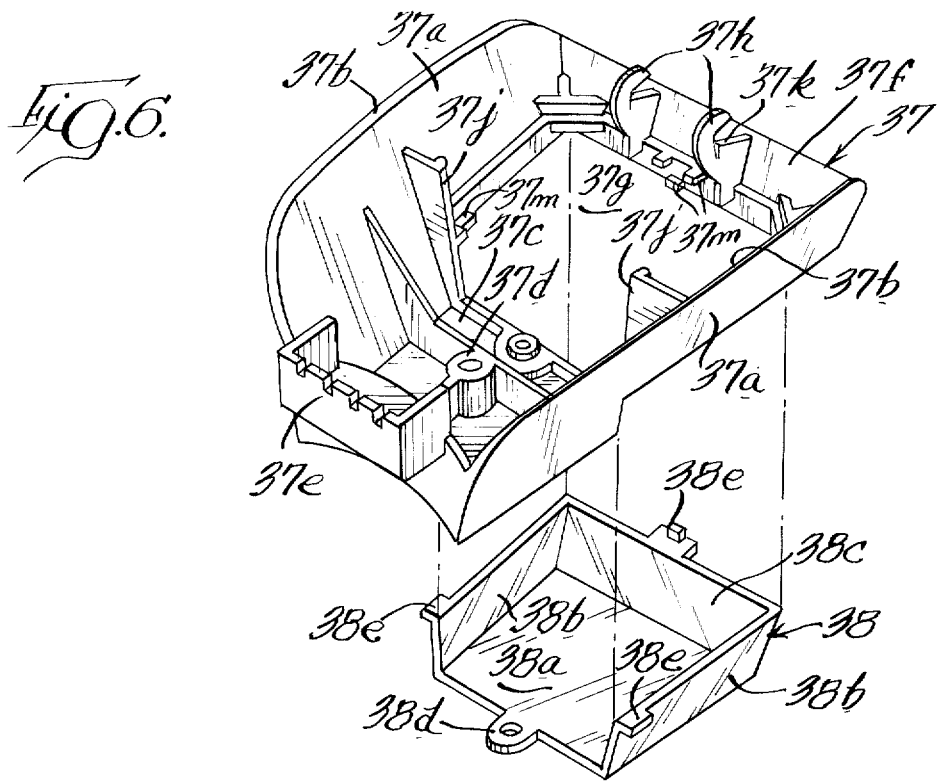
FIG. 6 is an exploded perspective view showing the frame and lense which form the enclosure within which the light is mounted.
Figure 8:
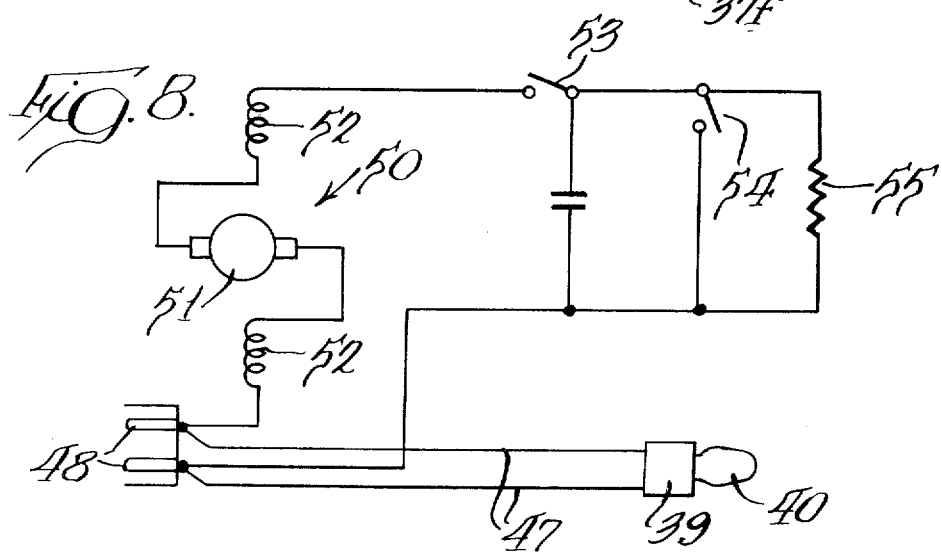
FIG. 8 is a schematic drawing showing the manner in which the light is connected in circuit with the mixer.

The power unit or mixer 15 includes a housing 18 which is generally tubular in shape and extends horizontally with respect to the surface on which the stand 12 would be supported. Associated with the housing 18 which encloses an electrical motor 50 (shown only in FIG. 8 schematically) is a handle 20 and beaters 21. The handle 20 is connected to housing 18 at the forward portion and includes a hand grip portion in spaced parallel relation to the housing as is best shown in FIG. 2.

The motor within the housing 18 is operated by means of a speed control knob 22 located at one end of the housing. The motor is arranged in the conventional manner to drive a gear reduction and a pair of spindles which support the beaters 21. The housing 18 is provided with a number of openings through which air is circulated for the purpose of cooling the motor contained therein. As is evident from FIGS. 3 and 4, there are slots 24 adjacent the forward portion of the mixer housing 18 and slots 25 located generally centrally along the bottom surface of the housing 18 and an opening 23 located adjacent control knob 22.

For the purpose of mounting the power unit 15 with respect to the stand 12, the upper end of the column portion 14 is formed with a pair of upwardly facing trunnions 26 which receive a transversely extending pin 27 supported on downwardly extending plate 28. The plates 28 are formed integrally with the housing 18 and extend in parallel spaced relation and embrace the top of the column portion 14. An adjustable bolt 30 is threadedly received in an opening in the housing 18 and extends downwardly into engagement with an abutment 31 formed on the column portion 14. The engagement between the head of the bolt 30 and the abutment 31 arrests the downward pivotal movement of the housing 18 around the pin 27 in the trunnions 26. The bolt 30 may be adjusted as to the amount of threaded engagement with housing 18 so that the power unit 15 extends generally horizontally.

In order to retain the pin 27 situated within the trunnions 26, there is provided a pivotal latch 32 which is pivotally connected to the column portion 14 by a pin 33 and located with an upper hook portion 34 which overlies the pin 27 and prevents the pin 27 from being lifted or deflected upwardly out of the trunnions 26. A suitable spring (not shown) biases the latch 32 to the engaged position as shown in FIG. 5.

The instant invention involves a light assembly 36 which is associated with the mixer housing 18. The light assembly 36 includes a frame 37 and a translucent cover or lense 38 which are assembled to form with the wall of the housing 18 an enclosure within which a light socket 39 and a bulb 40 are supported. The frame 37 is an inexpensive plastic molded part which may be readily assembled to the housing 18 of the mixer. The frame 37 is provided with sidewalls 37a which extend lengthwise along the housing 18 and have beveled edges 37b so that the outer surfaces of sidewalls 37a are tangent to and blend with the rounded sidewalls of the housing 18.

To eliminate any possibility of light shining through the crack where the walls 37a meet the housing 18, strips of gasketing 35 are secured to the housing 18 adjacent to the edges of walls 37a as best shown in FIG. 3. The gasketing 35 may take the form of foam tape having an adhesive side which may be used to secure it to housing 18 prior to securing the assembly 36 thereto.

At one end of the frame 37 there is provided a base portion 37c which extends between the walls 37a and includes a boss 37d on which the socket 39 is mounted by means of a rivet 41 as is best shown in FIG. 5. In addition, the frame 37 is formed with a mounting lug 37e which is provided with an opening through which the bolt 30 extends into engagement with the housing 18.

At the other end of the frame 37, there is a transverse wall 37f interconnecting the ends of the walls 37a and forming therewith an enlarged opening 37g within which the cover or lense 38 is mounted. As is best shown in FIG. 5, there are formed on the transverse wall 37f hooks 37h which extend through the slots 25 for the motor cooling air to retain the one end of the frame 37 adjacent the beaters engaged with the housing 18. This provides a simple and inexpensive manner of mounting the light assembly 36 with respect to the housing 18. The housing 18 is shown in a bottom view in the form it would take when the mixer 11 is sold without the light feature. In FIG. 3, the mixer is shown with the light assembly 36 attached to the bottom surface of the housing 18. No additional parts are required for this attachment or assembly; the bolt 30 is simply removed and a metal retainer 42 shown in FIG. 4 is removed and the light assembly 36 is secured by means of the hooks 37h and the bolt 30. The retainer 42 serves to hold in place a guard 23a which overlies the opening 23. The guard 23a prevents insertion of fingers or other objects into the mechanism contained within housing 18.

The lense 38 is made of a clear plastic with the inside surface roughened to diffuse the light and provide a more pleasing appearance. The lense 38 includes a bottom wall 38a, sidewalls 38b which are at right angles to bottom wall 38a, angled sidewalls 38c and an apertured retaining bracket 38d. Located on the walls 38b and 38c are assembly projections 38e which may be snapped into engagement with overhanging portions 37m of the frame 37. After these projections 38e have been snapped into assembly with the frame 37, an assembly screw 43 is inserted into the bracket 38d into engagement with the frame 37. It should be noted that between the lense 38 and the frame 37 there are provided slots 44 as best shown in FIG. 3 to permit air to circulate into the housing 18 through the slots 25. It should also be noted that the air circulating through the slots 25 tends to dissipate the heat associated with the bulb 40.

The frame 37 is formed of a lightweight molded plastic material and tends to be somewhat deformable under pressure or impact. In order to prevent the frame 37 from being distorted or flattened against the underside of the housing 18 and thereby damaging the socket 39 or bulb 40, the interior of the frame 37 is formed with walls 37j which extend inwardly from the sidewalls 37a. As is best shown in FIG. 5, the walls 37j are positioned closely adjacent the horizontal bottom wall of the housing 18. Accordingly, any impact against the base portion 37c of the frame 37 merely deflects the frame until the walls 37j engage the housing 18 at which time further distortion is prevented. This problem of distortion is, of course, enhanced because of the fact that the sidewalls 37a extend generally tangential to the curved walls of the housing 18 creating a tendency for the housing 18 to deflect the walls 37a outwardly and creating the possibility that the socket 39 and/or bulb 40 would be crushed against the side of the housing 18.

Figure 7:
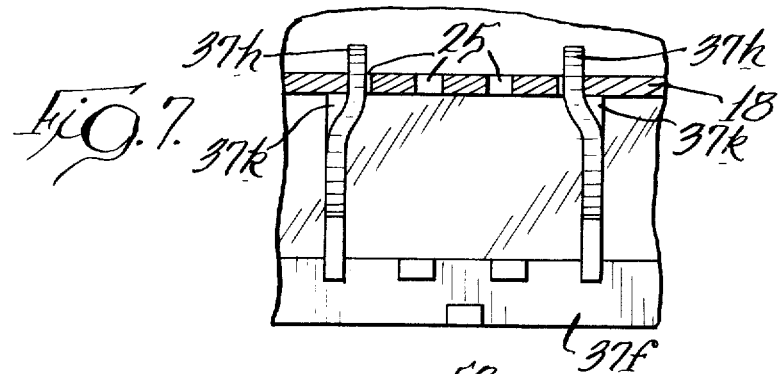
FIG. 7 is a sectional view taken on line 7—7 of FIG. 5.

As a further means to prevent this type of flexure, the hooks 37h are formed with vertical abutments 37k as shown in FIG. 7. The abutments 37k engage the flat wall of the housing 18 and prevent the wall 37f from being deflected downwardly and pushing the hooks 37h on through the air circulation slots 25. With the abutments 37k and the walls 37j, the light plastic frame 37 forms a relatively rigid appendage on the housing 18 and provides a simple means for the manufacturer to market alternatively the light equipped mixer or the one without the light.

It should be noted that the retainer 42 as shown in FIG. 4 serves to cover opening 46 through which leads 47 for the socket 39 may enter the housing 18 for connection to the power cord terminals. When the retainer 42 is replaced by the light attachment 36, the frame mounting lug 37e retains the guard 23a in place and also the frame 37 and lense 38 enclose the opening 46.

Referring to FIG. 8, there is shown a schematic layout or circuit diagram for the mixer 11. The mixer is provided with a receptacle having terminal pins 48 to which a suitable power cord may be attached. The leads 47 extending from the socket 39 are connected directly to the terminal pins 48. The mixer includes a motor 50 having armature 51 and field coils 52 which are also connected in series across the terminal pins 48. A suitable on/off switch 53, a governor control switch 54 and shunt resistance 55 are also connected in circuit with the motor 50 in conventional fashion. The circuit arrangement of the socket 39 and the bulb 40 is such that as soon as the mixer is plugged in, the light 40 is energized. The energization of the light 40 is not dependent on the operation of the motor. Thus, when the operator is engaged in reading a recipe or measuring out materials for later mixing with the mixer 11, the light from the light assembly 36 is available and helpful.

By having the light assembly 36 projecting below the housing 18 and having the bulb 40 extending downwardly into the lense 38, the light distributed from the bulb 40 falls over a large area as well as within the bowl 17. As a consequence, the light attachment serves a broader purpose than if it were positioned merely to illuminate the ingredients being mixed within the bowl 17. In addition, by having the light bulb 40 illuminated whenever the mixer 11 is plugged in, the light serves as a safety feature in apprising the operator of the fact that the mixer has been left plugged in. It is, of course, desirable and recommended that all appliances be unplugged when not being used.

While there has been shown and described a particular embodiment of the present invention, it will be apparent to those skilled in the art that various changes and modifications may be made without departing from the invention in its broader aspects, and it is, therefore, contemplated in the appended claims to cover all such changes and modifications as fall within the true spirit and scope of the present invention.

What is claimed as new and desired to be secured by Letters Patent of the United States is:

1. A household electric food mixer comprising an elongated housing, a motor enclosed in said housing, food beaters connected to said motor and supported at one end of said housing extending laterally therefrom, a handle connected to said housing and extending parallel thereto, an electric light including a bulb and socket connected in circuit with said motor and mounted on the exterior of said housing adjacent to said food beaters, mounting means for said socket including a frame having a base portion to which said socket is secured, said frame including a lense support which extends around said bulb and receives a lense, said frame and said lense cooperating with the sidewall of said housing to form an enclosure for said bulb and socket.

2. The household electric food mixer of claim 1 wherein said lense comprises a flat bottom wall and upright sidewalls to direct light from said bulb to said beaters and the area surrounding said mixers, said bulb projecting at least partially below said mounting means to direct light horizontally outwardly as well as downwardly.

3. The household electric food mixer of claim 1 wherein said housing includes openings for the circulation of air to said motor, said frame including mounting projections which engage said housing at said openings to retain said frame assembled to said housing with said enclosure overlying said openings.

4. The household electric food mixer of claim 3 wherein said lense is mounted to provide air circulation openings between said frame and said lense.

5. A household food mixer comprising a generally tubular housing having a speed control at one end and depending beaters detachably supported at the other end, a stand having an upright column and a base portion extending from the bottom thereof with a bowl turntable on said base portion, said housing and said column having means for supporting said housing at the top of said column with said housing extending horizontally, a light bulb and socket mounted on the underside of said housing adjacent said beaters, a frame for supporting said socket adjacent the bottom of said housing, said frame having flared sidewalls which engage said housing generally tangential thereto and a transversely extending base portion on which said socket is mounted, said frame defining an enlarged opening through which said bulb extends, a lense mounted in said opening to form with said frame an enclosure for said bulb and socket.

6. The mixer of claim 5 wherein said frame is formed of molded plastic, support walls formed in said frame extending inwardly from said sidewalls to engage the bottom of said mixer housing and prevent inward deflection of said base portion of said frame.

7. The combination of claim 5 wherein said housing is formed with air circulation openings in the walls thereof, said frame having projections on one end of said frame extending into said openings to retain said one end engaged with said housing, said means supporting said housing with respect to said column including a threaded assembly means which extends through the other end of said frame to retain said other end engaged with said housing.

8. The combination of claim 5 including a bowl adapted for use with said turntable, said bowl on said turntable being positioned below said bulb whereby light from said bulb will illuminate the area adjacent said mixer with said bowl is in place on said turntable.

9. The combination of claim 5 wherein said lense comprises a clear plastic member having the inner surface thereof textured to diffuse light from said bulb, said lense having a flat bottom wall with sidewalls extending normal to said bottom wall and a front wall extending between said sidewalls and angled with respect to said bottom wall forming a translucent enclosure for said bulb to distribute light to the sides to the front and downwardly with respect to said bulb.

10. The combination of claim 5 including gasket means between said flared sidewalls and said housing to seal the abutting portions of said frame and said housing against leakage of light.

* * * * *